(12) United States Patent
Polyzos et al.

(10) Patent No.: US 10,676,586 B2
(45) Date of Patent: Jun. 9, 2020

(54) NANOCOMPOSITE ADDITIVES BASED ON GRAPHENE SHEETS AND SILICA NANOFIBERS

(71) Applicant: UT-Battelle, LLC, Oak Ridge, TN (US)

(72) Inventors: Georgios Polyzos, Knoxville, TN (US); Jaswinder K. Sharma, Oak Ridge, TN (US); Ivan V. Vlassiouk, Oak Ridge, TN (US); Daniel A. Schaffer, Knoxville, TN (US); Panagiotis G. Datskos, Knoxville, TN (US); Timothy J. LaClair, Oak Ridge, TN (US); Jaehyeung Park, Busan (KR)

(73) Assignee: UT-Battelle LLC, Oak Ridge, TN (US)

(*) Notice: Subject to any disclaimer, the term of this patent is extended or adjusted under 35 U.S.C. 154(b) by 153 days.

(21) Appl. No.: 16/000,975

(22) Filed: Jun. 6, 2018

(65) Prior Publication Data

US 2018/0346684 A1    Dec. 6, 2018

Related U.S. Application Data

(60) Provisional application No. 62/515,568, filed on Jun. 6, 2017.

(51) Int. Cl.
| | | |
|---|---|---|
| *C08K 3/04* | (2006.01) | |
| *D01D 5/00* | (2006.01) | |
| *C08K 9/06* | (2006.01) | |
| *D01F 9/08* | (2006.01) | |
| *C08K 3/36* | (2006.01) | |
| *C08K 7/10* | (2006.01) | |

(52) U.S. Cl.
CPC ............ *C08K 3/042* (2017.05); *C08K 9/06* (2013.01); *D01D 5/003* (2013.01); *D01F 9/08* (2013.01); *C08K 3/36* (2013.01); *C08K 7/10* (2013.01); *C08K 2201/003* (2013.01); *C08K 2201/006* (2013.01); *D10B 2101/06* (2013.01)

(58) Field of Classification Search
CPC . C08K 3/042; C08K 3/36; C08K 7/10; C08K 9/06; D01D 5/003; D01F 9/08
USPC ........................................ 524/493, 495, 496
See application file for complete search history.

(56) References Cited

U.S. PATENT DOCUMENTS

2019/0143461 A9*  5/2019  Venkatagiriyappa .. C08K 3/013
                                                            228/248.1

* cited by examiner

*Primary Examiner* — Edward J Cain
(74) *Attorney, Agent, or Firm* — Warner Norcross + Judd LLP

(57) ABSTRACT

A method for producing a composite polymeric article, an additive for a polymeric article, and a composite polymeric article are provided. The method generally includes providing a plurality of graphene nanoplatelets, providing a plurality of silica nanofibers, providing a polymeric material, and distributing the plurality of silica nanofibers and the plurality of graphene nanoplatelets within the polymeric material to achieve a composite article. The additive for a polymeric article includes a plurality of graphene nanoplatelets and a plurality of silica nanofibers. The composite polymeric article includes a plurality of graphene nanoplatelets, a plurality of silica nanofibers, and a polymeric matrix. The plurality of graphene nanoplatelets and the plurality of silica nanofibers are distributed within the polymeric matrix. The silica nanofibers have a mean cross sectional diameter of not more than 100 nm.

15 Claims, 3 Drawing Sheets

NANOCOMPOSITE ADDITIVES BASED ON GRAPHENE SHEETS AND SILICA NANOFIBERS

CROSS-REFERENCE TO RELATED APPLICATION

This application claims the benefit of U.S. Provisional Application 62/515,568, filed Jun. 6, 2017, the disclosure of which is hereby incorporated by reference in its entirety.

STATEMENT REGARDING FEDERALLY SPONSORED RESEARCH AND DEVELOPMENT

This invention was made under Cooperative Research and Development Agreement No. NFE-15-05490 between UT-Battelle, LLC under its U.S. Department of Energy Contract No. DE-AC05-00OR22725 and Michelin North America, Inc., acting through its division Michelin Americas Research Company. The government has certain rights in the invention.

BACKGROUND OF THE INVENTION

The present invention relates to nanomaterial fillers for polymeric articles and, in particular, nanomaterial graphene and silica for rubber articles, including tires and other articles.

In the materials science of elastomers, the influence of manufactured nanomaterial fillers is of utmost significance to the performance of innovative rubber products, e.g., tires having low rolling resistance, high wear resistance, and high traction. Advances in these performance areas are imperative for the development of improved tire efficiency to meet a fuel consumption reduction target of up to 4% while maintaining or improving wear characteristics of the tire.

Recent research has focused mainly on the development of composite tires having carbon black fillers or silica fillers. However, these composite tires lack the required performance for breakthrough advances in fuel cost reduction. While incremental advances can be achieved by improving the dispersion of fillers and by optimizing the manufacturing process, an approximately 4% reduction in vehicle fuel consumption requires a comprehensive redesign of the filler material.

Accordingly, there remains a continued need for improved fillers for composite polymeric articles, including rubber articles. In particular, there remains a continued need for nanomaterial fillers that can be used in advanced tire manufacturing for improvements in the rolling resistance and wear resistance of tires, and for other applications.

SUMMARY OF THE INVENTION

Improved nanomaterial fillers for composite polymeric articles are provided. The nanomaterial fillers, or "nanomaterial additives" as used herein, include graphene platelets and silica nanofibers to provide rubber and other polymers with improved properties. In one application, the nanomaterial additives are dispersed in rubber tires to provide unprecedented improvements in the rolling resistance and wear resistance of tires for breakthrough fuel savings. In other applications, the nanomaterial additives can be used in the manufacture of improved mechanical belts, bumpers, shoe outsoles, damper, and shock mounts, for example.

In one aspect of the invention, a method for producing a composite polymeric article is provided. The method includes distributing a plurality of silica nanofibers and a plurality of graphene nanoplatelets within a polymeric material to achieve a composite article, optionally by solution blending. The silica nanofibers include a mean diameter of not more than 100 nm, and the graphene platelets include a mean diameter of not more than 100 µm. The polymeric material is optionally rubber, further optionally styrene-butadiene rubber for vehicle tires.

In one embodiment, the silica nanofibers are fabricated by electrospinning a sol-gel precursor. The sol-gel precursor is prepared by hydrolysis of a silicate in the presence of a catalyst, an amphiphilic polymer, and a solvent. The silica nanofibers are then calcinated and modified to generate hydrophobicity. A silane can be used to modify the silica nanofibers to generate hydrophobicity. The graphene nanoplatelets include graphene oxide covalently modified with an amide or ester functionalized molecule. The graphene oxide in alternative embodiments is covalently modified with dodecylamine. The graphene can have a surface area per unit weight up to 1000 $m^2/g$.

In another aspect of the invention, a composite polymeric article is provided. The composite polymeric article includes a plurality of graphene nanoplatelets and a plurality of silica nanofibers dispersed within a polymeric matrix. The plurality of silica nanofibers have a mean cross sectional diameter of not more than 100 nm. The graphene nanoplatelets make up less than 1 percent by volume of the composite polymeric article or, alternatively, less than 5 percent by weight of the polymeric matrix. The plurality of silica nanofibers make up between 20 percent and 25 percent of the volume of the composite polymeric article or, alternatively, approximately 20 percent by weight measured with respect to the mass of the polymeric matrix.

In some embodiments, the polymeric matrix is an elastomeric polymer. The elastomeric polymer can be styrene-butadiene rubber. The composite polymeric article can comprise additional fillers. In some embodiments the composite article is a tire or an element of a tire, a mechanical belt or an element of a mechanical belt, a bumper or an element of a bumper, a shoe sole or an element of a shoe sole, a damper or an element of a damper, or a shock mount or an element of a shock mount.

The present invention enables the tailoring of the nanoscale properties of a composite polymeric material. Moreover, the present invention provides an alternative to existing fillers used in combination with polymeric materials and can provide for a reduction in hysteric losses and provide for uniform temperature distribution in a composite polymeric article. The above embodiments further enable the production of a vehicle tire having improved wear characteristics and being capable of increasing the overall fuel efficiency of a vehicle upon which it is installed. The above embodiments further provide for additives that are modified so that a polymeric material may more effectively be absorbed to the surface thereof.

These and other features and advantages of the present invention will become apparent from the following description of the invention, when viewed in accordance with the accompanying drawings and appended claims.

DETAILED DESCRIPTION OF THE CURRENT EMBODIMENT

Figure 1:
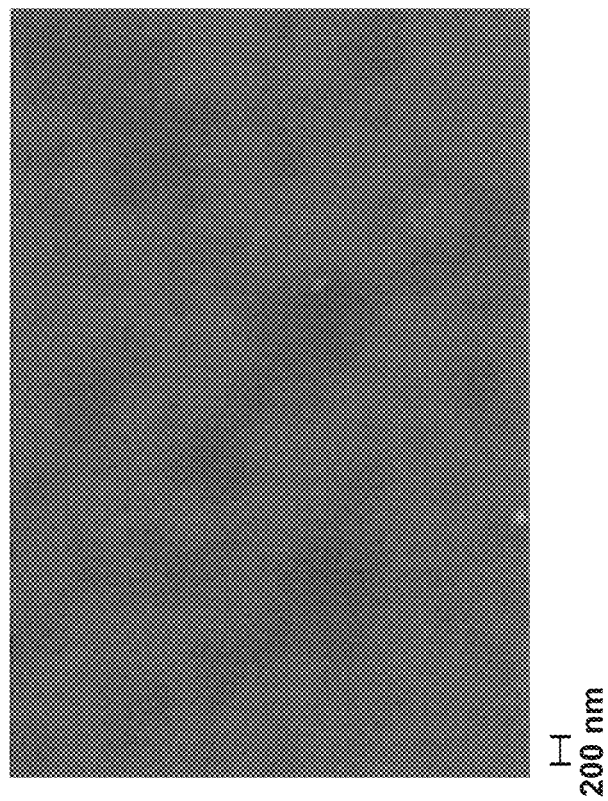
FIG. 1 are Scanning electron microscopy (SEM) micrographs of graphene nanoplatelets prepared according to an embodiment of the present invention.
Figure 1:
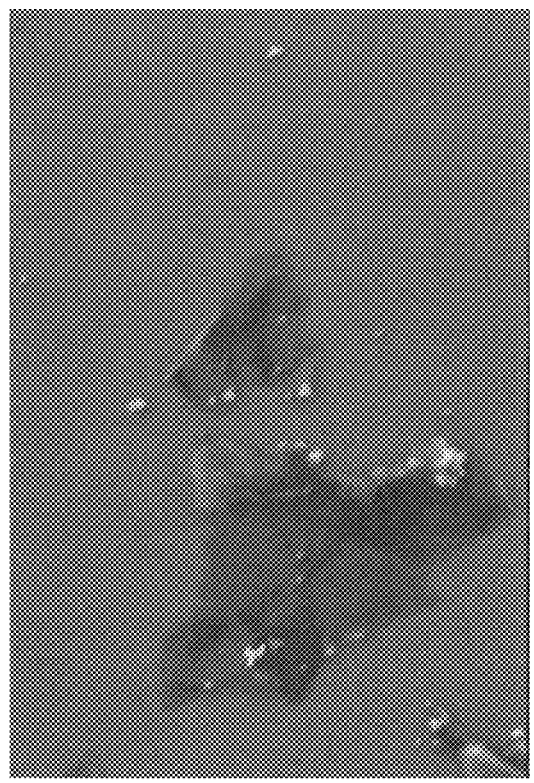

The invention as contemplated and disclosed herein includes a method for producing composite polymeric articles having nanomaterial additives. As set forth more fully below, the method includes distributing a plurality of silica nanofibers and a plurality of graphene nanoplatelets, as the nanomaterial additives, within a polymeric material to achieve a composite article. In several Examples included below, the nanomaterial additives achieved improvements not found with existing additives, including for example carbon black and silica.

In the current embodiment, the plurality of silica nanofibers have a mean cross sectional diameter of not more than 100 nm, further optionally, between 50 nm and 100 nm inclusive. As used herein, "nanofiber" refers to continuous filaments having a mean diameter of less than 100 nm, optionally defining a circular cross-section along their lengths. The plurality of silica nanofibers are fabricated by electrospinning of a sol-gel precursor, as described in further detail in the Examples. In general, the sol-gel precursor is prepared by hydrolysis of a silica-based compound in the presence of a catalyst, an amphiphilic polymer, and a solvent. In some embodiments the solvent is an alcohol, optionally a short-chain alkanol, further optionally ethanol. In alternative embodiments the catalyst is an acid catalyst, optionally hydrochloric acid. Non-limiting limiting examples of amphiphilic polymers include polyvinyl pyrrolidone (PVP), polyethylene glycol (PEG), polyoxy ethylene (POE), polyethylene oxide (PEO), and combinations thereof. Optionally, the silica based compound is a silicate, further optionally the silica based compound is tetraethyl orthosilicate. The silica nanofibers in some embodiments are electrospun at a constant flow rate at high voltage, optionally 18 kV, and collected on an aluminum foil collector. The silica nanofibers are calcinated, ground, and rendered hydrophobic through surface treatment, optionally with a silane, further optionally with triethoxy(octyl)silane. The silica nanofibers have high tensile strength and nanoscale diameters (50-100 nm) and an intrinsically low incidence of defects.

The plurality of graphene nanoplatelets include well-defined structures of atomically thin self-assembled graphene layers. Optionally, each graphene nanoplatelet includes a single layer of graphene. The graphene nanoplatelets may form a stack of several graphene single layers. The graphene nanoplatelets having a mean diameter of less than 100 μm (across the widest portion thereof) and have a unique geometrical configuration providing for up to 1000 $m^2/g$ surface area per unit weight. In addition, the graphene nanoplatelets can include covalently modified graphene oxide. Covalently modified graphene oxide nanoplatelets are prepared by reacting graphene oxide with an amide or ester functionalized molecule, optionally octadecylamine, dodecylamine, and hexadecylamine. Further optionally, the graphene oxide can be covalently modified using a silane. Still optionally, the graphene can be covalently functionalized with a plurality of polymer chains. Additionally, the graphene oxide can be non-covalently modified, optionally with a polymer chain. Covalent or non-covalent modification of graphene oxide nanoplatelets enables the production of graphene nanoplatelets with tailored properties. Covalently modified graphene oxide can be prepared by reacting graphene oxide suspended in a solvent, optionally an alcohol, further optionally ethanol, in the presence of an amide or ester functionalized molecule. Covalently modified graphene oxide can be isolated from the reaction mixture by filtration, rinsing, and drying.

The polymeric material is optionally an elastomeric material, further optionally styrene-butadiene rubber (SBR). The polymeric composition of the polymeric material is not limiting and can include silicone-based polymeric substances as well as organic polymers. Non-limiting examples of polymeric materials include natural rubber, nitrile rubber, polyisoprene, styrene-butadiene, polybutadiene, halobutyl rubber, ethylene propylene diene monomer rubber, silicone rubber, bromobutyl rubber, chloroprene rubber, and combinations thereof.

The composite polymeric article in some embodiments is prepared by solution blending, but solution blending is a non-limiting example of methods by which the plurality of silica nanofibers and plurality of graphene nanoplatelets may be combined with the polymeric material. When the composite polymeric article is prepared by solution blending, the silica nanofibers, optionally surface modified to be hydrophobic, can be combined with graphene nanoplatelets, optionally covalently modified graphene oxide nanoplatelets, further optionally dodecylamine modified graphene oxide nanoplatelets. The composite polymeric article can be prepared by dispersing the silica nanofibers and graphene nanoplatelets in a solvent, optionally toluene, with the polymeric material to form a mixture. The mixture can then be coagulated, optionally through addition of a diluent, further optionally an alcohol, optionally methanol. The coagulated material can be separated from the non-coagulated material, optionally by filtration, and dried, optionally for use as a resin in the manufacture of a mechanical belt, a bumper, a shoe sole, a damper, or a shock mount.

Fillers can be added to the composite polymeric article other than graphene nanoplatelets or silica nanofibers. Additional non-limiting examples of fillers include corn starch, walnut shells, wood pulp, blacks (e.g., carbon black), clays, fumed silicas, precipitated silica, calcium carbonate, silica, carbon black, nanocellulose crystals, carbon nanotubes, and mixtures thereof. Additional optional ingredients may be added to the composite polymeric article such as antioxidants, antiozonants, softeners, abrasives, colorants, flame retardants, homogenizing agents, blowing agents, odorants, accelerators, retarders, anti-aging agents, and mixtures thereof.

The high surface area of the graphene nanoplatelets was found by the inventors to provide breakthrough reductions in the rolling resistance of tires. Graphene nanoplatelets have the further advantageous physical properties of a high Young's modulus, high tensile strength, and high thermal conductivity. It was found that parallel improvements in material properties, often originating from competing mechanisms, can be achieved by synergistically combining additives with complementary properties. For instance, hysteretic losses can be reduced by the incorporation of graphene nanoplatelets at low concentrations (~1 vol. %); however, the abrasion and tear resistance (wear resistance) of the tire is optimal when the additive concentration is approximately 20-25 vol. %. Moreover, a significant increase of the graphene nanoplatelet concentration will eventually increase the rigidity (brittleness) of the rubber matrix and will compromise the elastic properties and traction of the tire. Therefore, to sharply enhance the wear resistance of the tire without compromising its viscoelastic properties (i.e. traction) an additional filler, in particular silica nanofibers, are advantageously used in combination with graphene nanoplatelets. The silica nanofibers are cross-linked to the rubber matrix to form robust flexible interfaces that provide a reinforcement network with extraordinary mechanical integrity and wear resistance. Silica nanofibers have the advantageous properties of high flexibility and high tensile strength.

The complimentary properties of silica nanofibers and graphene nanoplatelets enables the two additives to be used in combination to tailor the viscoelastic properties of a composite polymeric article. In relation to vehicle tires, the rolling resistance is directly associated with the tire's internal energy and the hysteric power dissipation. The temperature of a tire depends on the combination of rolling resistance and speed (power input). Although heat transfer coefficients typically increase as speed increases, the relationship between heat transfer rate and speed does not follow a linear relationship. Therefore, the temperature of the tire can increase rapidly (even beyond thermal equilibrium) at high speeds. In the typical operating range for tire rubber, the hysteretic losses, and, therefore, the rolling resistance, are decreasing when the internal temperature of the tire increases. An increase in tire temperature of approximately 1° C. corresponds to a 0.6% reduction in the rolling resistance of the tire. The high thermal conductivity and surface area of the graphene additives provide a uniform temperature distribution throughout the entire structure of the rubber matrix and thus results in lower rolling resistance and higher tire performance.

The invention as contemplated and disclosed herein includes an additive for a polymeric article. The additive includes a plurality of graphene nanoplatelets, as described above, and a plurality of silica nanofibers, as described above. The silica nanofibers have a mean cross sectional diameter of not more than 100 nm. The silica nanofibers optionally have an average cross sectional diameter of at least 50 nm. The additive can be used as an advantageous replacement for existing fillers used in the production of composite polymeric articles.

The invention as contemplated and disclosed herein further includes a composite polymeric article including a plurality of graphene nanoplatelets, described above, and a plurality of silica nanofibers, described above, and a polymeric matrix, described above. The plurality of graphene nanoplatelets and the plurality of silica nanofibers are distributed within the polymeric matrix, optionally in accordance with the method described above and provided as Example 3 below. The silica nanofibers have an average cross sectional diameter of not more than 100 nm.

The plurality of graphene nanoplatelets optionally constitutes less than 10, 8, 6, 5, 4, 2, 1, or 0.5 percent by volume of the composite polymeric article and greater than 0% by volume. The plurality of graphene nanoplatelets further optionally constitutes less than 10, 8, 6, 5, 4, 2, 1, or 0.5 percent by weight of the polymeric matrix and greater than 0%. The plurality of silica nanofibers optionally constitutes 10-30, 15-25, or 20-25 percent of the volume of the composite polymeric article. The plurality of silica nanofibers further optionally constitutes less than approximately 30, 25, 20, 15, 10, or 5 percent by weight of the polymeric matrix and greater than 0%. The composite polymeric article can optionally further include the additional fillers or optional additives listed above, or combinations thereof. The composite polymeric article can be used in any of a number of non-limiting applications, including those already listed above.

Example 1

Graphene nanoplatelets were prepared according to the following example, which is intended to be non-limiting.

A solution of dodecylamine (DA) in ethanol was added to a suspension of graphene oxide in ethanol (2 mg/ml). The mixture was refluxed at 90° C. with stirring for 20 hr and then filtrated with a membrane with an average pore size of 0.45 µm. To remove the physically absorbed DA, the filtrated powder was rinsed with ethanol three times. Finally, the mixture was dried in an oven at 80° C. for 24 hr.

Example 2

Silica nanofibers were synthesized according to the following example, which is intended to be non-limiting.

Figure 3:
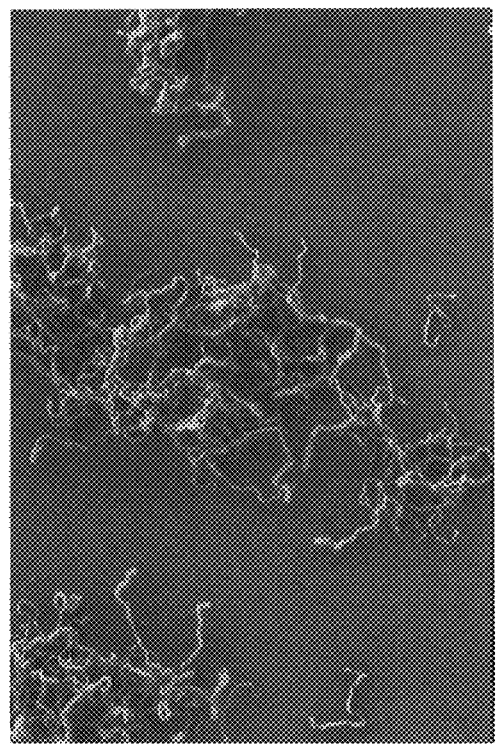
FIG. 3 are SEM micrographs of silica nanofibers formed according to an embodiment of the present invention.
Figure 3:
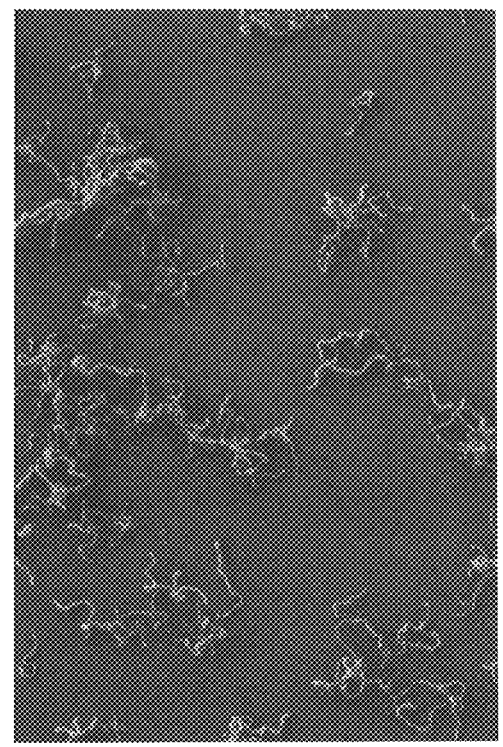

Silica nanofibers (diameter<100 nm) (SEM micrographs of exemplary silica nanofibers are provided as FIG. 3) were fabricated by an electrospinning technique using a sol-gel precursor. The sol-gel precursor was prepared by hydrolysis of tetraethyl orthosilicate (TEOS) in a solution including polyvinyl pyrolidone (PVP, Mw=130,000 g/mol) dissolved in ethanol. PVP was dissolved in ethanol at 5 wt. % and stirred at 60° C. until it formed a uniform solution and 0.5 g of TEOS was then added into the PVP solution. After 20 min, 0.1 g of 2 M HCl was added into the solution as a catalyst and stirred for another 30 min and then cooled down to room temperature. The solution was electrospun at a constant flow rate of 25 µL/min at a high voltage of 18 kV. The PVP/silica nanofibers were collected on an aluminum foil collector kept at a distance of 15 cm from the needle tip. The resulting nanofibers were dried at 80° C. for 12 hr. The pure silica nanofibers were finally obtained by calcination at 650° C. for 12 hr. The prepared silica nanofibers were ground with mortar and pestle and then modified with triethoxy(octyl)silane.

Example 3

A styrene-butadiene rubber (SBR) composite was prepared according to the following example, which is intended to be non-limiting.

The SBR composite was prepared by solution blending. The prepared octylsilane modified ground silica nanofiber (15 wt. % of SBR) and dodecylamine modified graphene (4 wt % of SBR) were dispersed and exfoliated in toluene by ultrasonicator for 0.5 hr. The resulting suspension was added to an SBR solution in toluene. The mixture was homogenized using a shear mixer at 9,000 rpm at ambient temperature for 0.5 hr. The SBR composite was then obtained by coagulating in methanol and filtering. The precipitate was dried in a vacuum oven at 80° C. for 3 days.

Figure 2:
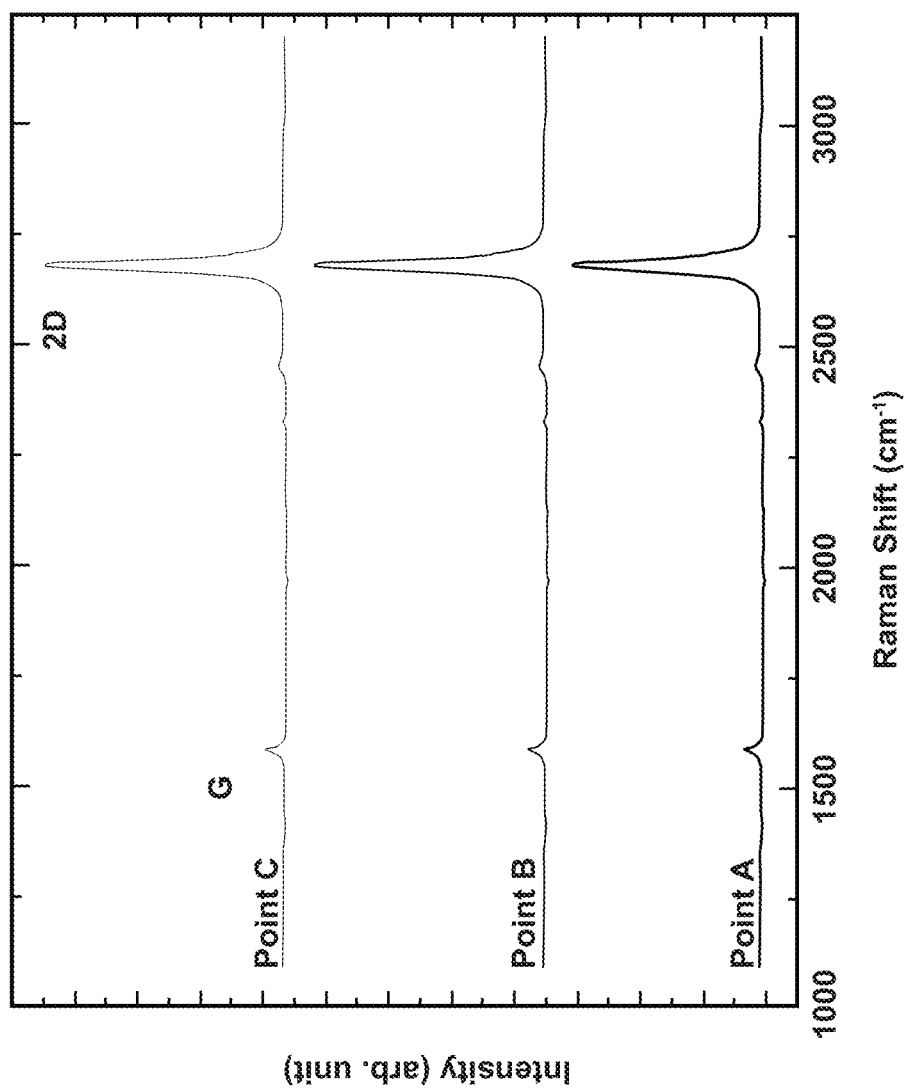
FIG. 2 is a Raman spectrograph of a graphene nanoplatelet prepared according to an embodiment of the present invention demonstrating that the nanoplatelet comprises a single layer of graphene.

SEM micrographs of graphene nanoplatelets subsequent to exfoliation in solution under high-shear mixing and ultrasonic agitation and representative of the graphene nanoplatelets used in this example are provided as FIG. 1. Moreover, Raman spectrographs taken at different points on a single graphene nanoplatelet sheet representative of the graphene nanoplatelets used in the present example are provided as FIG. 2. Inspection of the Raman spectrographs verifies that the graphene nanoplatelet indeed comprised a sheet including a single layer of graphene; namely, the 2D band is observed to be a single symmetric peak with a full width at half maximum.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular. The technology disclosed and claimed herein may be available for licensing in specific fields of use by the assignee of record.

The invention claimed is:

1. A method of producing a composite polymeric article comprising:
   providing a plurality of graphene nanoplatelets;
   providing a plurality of silica nanofibers, wherein the plurality of silica nanofibers have a mean cross sectional diameter of not more than 100 nm;
   providing a polymeric material; and
   distributing the plurality of silica nanofibers and the plurality of graphene nanoplatelets within the polymeric material to achieve a composite article.

2. The method according to claim 1, wherein the plurality of silica nanofibers are fabricated by electrospinning of a sol-gel precursor.

3. The method according to claim 2, wherein the sol-gel precursor is prepared by hydrolysis of a silicate in the presence of a catalyst, an amphiphilic polymer, and a solvent.

4. The method according to claim 3, wherein the plurality of silica nanofibers are calcinated and modified to generate hydrophobicity.

5. The method according to claim 4, wherein the plurality of silica nanofibers are modified with a silane.

6. The method according to claim 1, wherein the plurality of silica nanofibers and the plurality of graphene nanoplatelets are distributed within the polymeric material by solution blending.

7. A composite polymeric article comprising:
   a plurality of graphene nanoplatelets;
   a plurality of silica nanofibers, wherein the plurality of silica nanofibers have a mean cross sectional diameter of not more than 100 nm; and
   a polymeric matrix, wherein the plurality of graphene nanoplatelets and the plurality of silica nanofibers are distributed within the polymeric matrix.

8. The article of claim 7, wherein the plurality of graphene nanoplatelets constitutes less than 1 percent by volume of the composite polymeric article.

9. The article of claim 7, wherein the plurality of graphene nanoplatelets constitutes less than 5 percent by weight of the polymeric matrix.

10. The article of claim 7, wherein the plurality of silica nanofibers constitutes between 20 percent and 25 percent of the volume of the composite polymeric article.

11. The article of claim 7, wherein the plurality of silica nanofibers constitutes less than approximately 20 percent by weight of the polymeric matrix.

12. The article of claim 7, wherein the polymeric matrix is an elastomeric polymer.

13. The article of claim 12, wherein the polymeric matrix is a styrene-butadiene rubber.

14. The article of claim 7, wherein the composite polymeric article comprises additional fillers.

15. The article of claim 7, wherein the composite polymeric article is a tire or an element thereof, a mechanical belt or an element thereof, a bumper or an element thereof, a shoe sole or an element thereof, a damper or an element thereof, or a shock mount or an element thereof.

* * * * *